May 6, 1941.  F. M. CARROLL  2,240,549
CARD PUNCHING MACHINE
Filed May 11, 1939  8 Sheets-Sheet 1

May 6, 1941.　　　　　F. M. CARROLL　　　　2,240,549
CARD PUNCHING MACHINE
Filed May 11, 1939　　　　8 Sheets-Sheet 4

INVENTOR
Fred M. Carroll
BY
W. M. Wilson
ATTORNEY

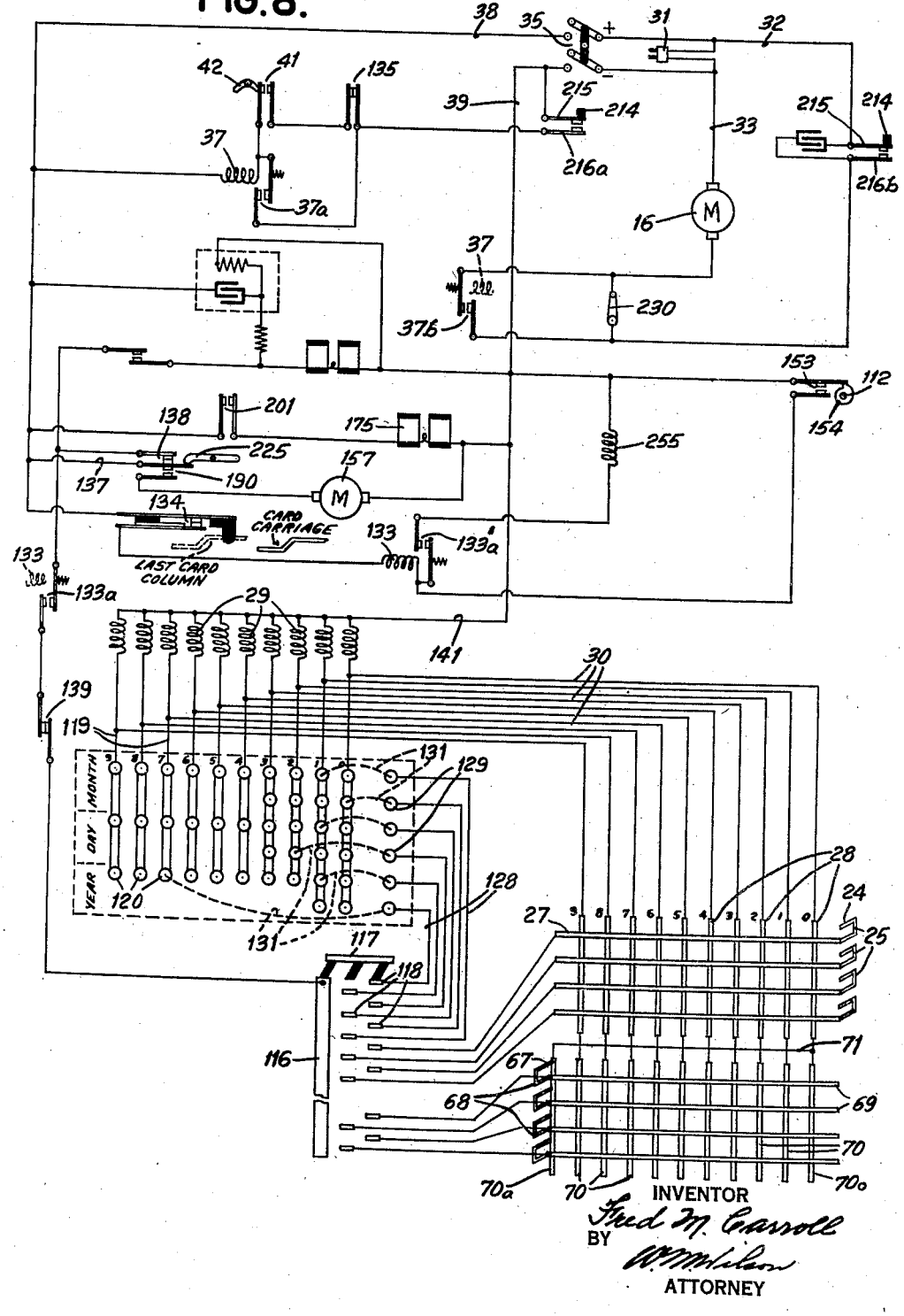

May 6, 1941.  F. M. CARROLL  2,240,549
CARD PUNCHING MACHINE
Filed May 11, 1939  8 Sheets-Sheet 6

INVENTOR
Fred M. Carroll
BY
ATTORNEY

May 6, 1941.  F. M. CARROLL  2,240,549
CARD PUNCHING MACHINE
Filed May 11, 1939  8 Sheets-Sheet 7

INVENTOR
Fred M. Carroll
BY
ATTORNEY

May 6, 1941.　　　　　M. CARROLL　　　　　2,240,549
CARD PUNCHING MACHINE
Filed May 11, 1939　　　　8 Sheets-Sheet 8
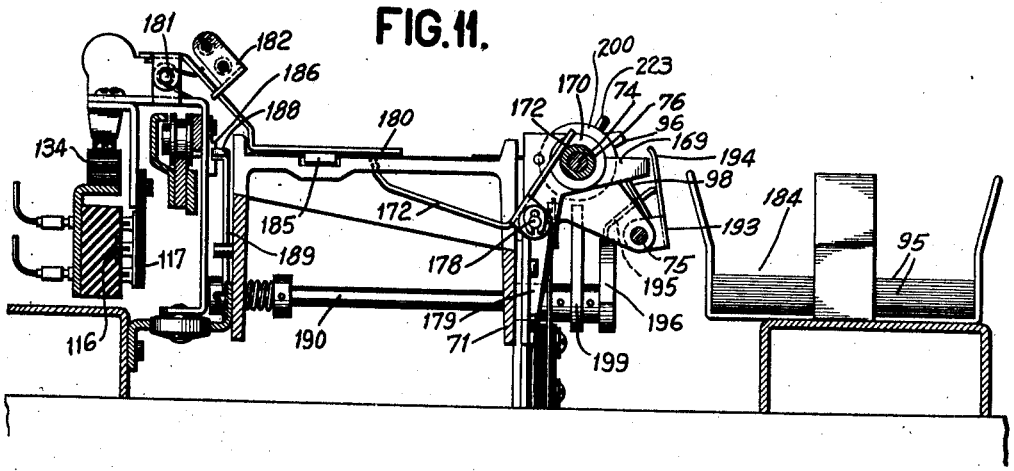
FIG.11.
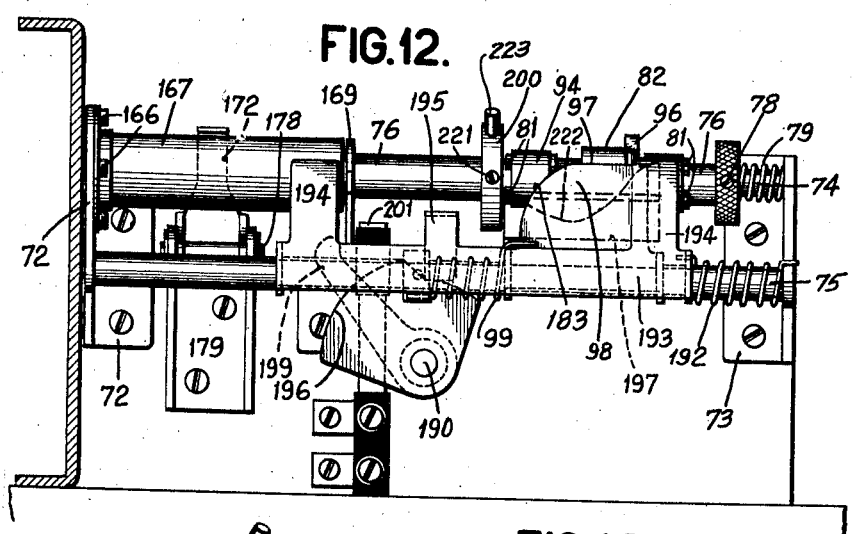
FIG.12.
FIG.13.
FIG.14.
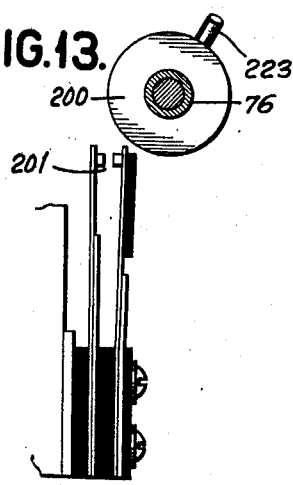
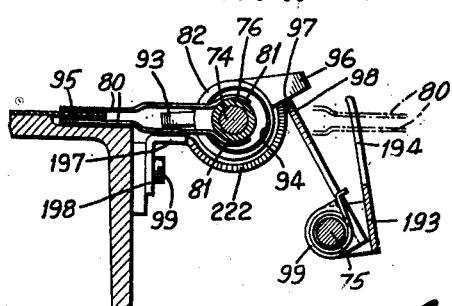
INVENTOR
Fred M. Carroll
BY
ATTORNEY Patented May 6, 1941

2,240,549

UNITED STATES PATENT OFFICE 2,240,549

CARD PUNCHING MACHINE

Fred M. Carroll, Binghamton, N. Y., assignor to International Business Machines Corporation, New York, N. Y., a corporation of New York Application May 11, 1939, Serial No. 272,989

3 Claims. (Cl. 164—113)

The present invention relates to accounting machines such as cash registers, and particularly to the type in which punching mechanisms are provided for punching a tabulating card to represent the entry effected in the cash register.

The cash register controlling the punching mechanism shown herein is of a type which is well known, shown in many patents, and is also in commercial use. This form of cash register is ordinarily provided with a number of totalizers for segregating the sales according to different classifications. The number of totalizers is, however, limited and while they may meet the requirements of certain accounting systems, it is desirable, at times, to effect a further segregation or analysis of items. This function is attained in substantially unlimited scope by the use of tabulating cards which are capable of being punched to represent items of a series of classifications and which may exceed the number of totalizers already provided in the cash register.

It is, therefore, the main object of the present invention to provide a cash register of a well known type with a punching mechanism for permitting the segregate analysis of the items entered in the cash register by the use of punched cards.

A still further object of the invention is to devise a structural arrangement whereby the punching mechanism may be controlled by the cash register without changing the operation or structure of the cash register or effecting, in any way, any change in the external appearance of the cash register or requiring a change in the mode of operation thereof.

In carrying out the last-mentioned object advantage is taken of the differential movements of certain of the parts of the cash register, and such parts are adapted to perform the function of a punch selecting mechanism for the punching machine.

In carrying out another object of the invention, the punching machine is preferably located in the usual cash drawer of the cash register and so positioned that the punching machine may be operated with the drawer closed. The opening of the drawer will provide access to the punching machine so that access may be readily had to the punching machine when it is not in operation for the purpose of removing punched cards, inserting a new supply of cards, adjustment, repair and service. Sometimes, an inspection of the punching machine is desirable while it and the cash register are in operation and in the present arrangement flexible wire connections to the punching machine enable unbroken electrical connections from the cash register to the punching machine so that while the drawer is open the operation of the punching machine may be readily observed.

The above construction is of value in cash registers which are now in commercial use and which may not have incorporated therein punching machines, and such connection may be effected without requiring that the cash register be sent to the factory, since the nature of the changes required for connection to a punching machine is such that they may be readily effected by a service-man, and without removing the cash registers from the place in which they are installed.

A still further object of the invention, and a relatively important one, is to provide an interlocking mechanism between the cash register and the punching machine which prevents a successive operation of the cash register before the punching of a tabulating card is completed. Where punching is to be effected in a number of columns such punching operations usually require a longer time than the time required to effect a cycle of operation of the cash register. Without the provision of a suitable locking mechanism, it is obvious that the attempt of the operator to effect the entry of a successive item would disturb the operation of punch selecting elements controlling the punching machine if the latter has not completed punching operations for a tabulating card. One form of interlock which is provided in the present machine is to provide a means for rendering it impossible to close the circuit of the motor of the cash register until the punching operations have been completed. This would ordinarily be an efficient type of lock and prevent misoperations. However, the nature of the motor which is utilized in the cash register of a well known type requires an additional locking mechanism which would prevent the clutching connection between the operating parts of the cash register and the spinning armature of the motor. As is well known in the type of cash register shown herein a motor release bar is provided to effect upon its depression a clutch connection between the armature of the motor and the operating mechanism of the cash register. Upon the completion of the cycle of operation of the cash register, the clutch connection is disabled, but the armature, due to its momentum, keeps on spinning idly. If no means were provided, it is obvious that when the motor release bar is again depressed, the clutch connection could again be made which would effect the partial operation of the operating mechanism of the cash register which would result in shifting the parts of the cash register controlling the punch selecting mechanism out of their adjusted position, thereby causing improper punching operations.

Misoperations of the type just mentioned, and which are inherent in the form of cash register shown herein, are effectively prevented by providing means under control of the punching machine for effectively locking the motor release bar against operation until punching operations have been completed. By the provision of the aforementioned interlocking devices of the two types just described, misoperations are effectively prevented thereby increasing the efficiency of the combined arrangement.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 2A is a plan view of a punched card.

Fig. 8 is an electrical wiring diagram.

Fig. 11 is a transverse sectional view taken on the line 11—11 of Fig. 10 and on the same scale with respect to the last-mentioned figure.

Fig. 12 is a view in front elevation showing certain parts of the punching machine and is taken on the line 12—12 of Fig. 10.

Fig. 13 is a detail view showing one of the contact closing devices and associated contacts.

Fig. 14 is a transverse sectional view taken on the line 14—14 of Fig. 10.

Figure 1:
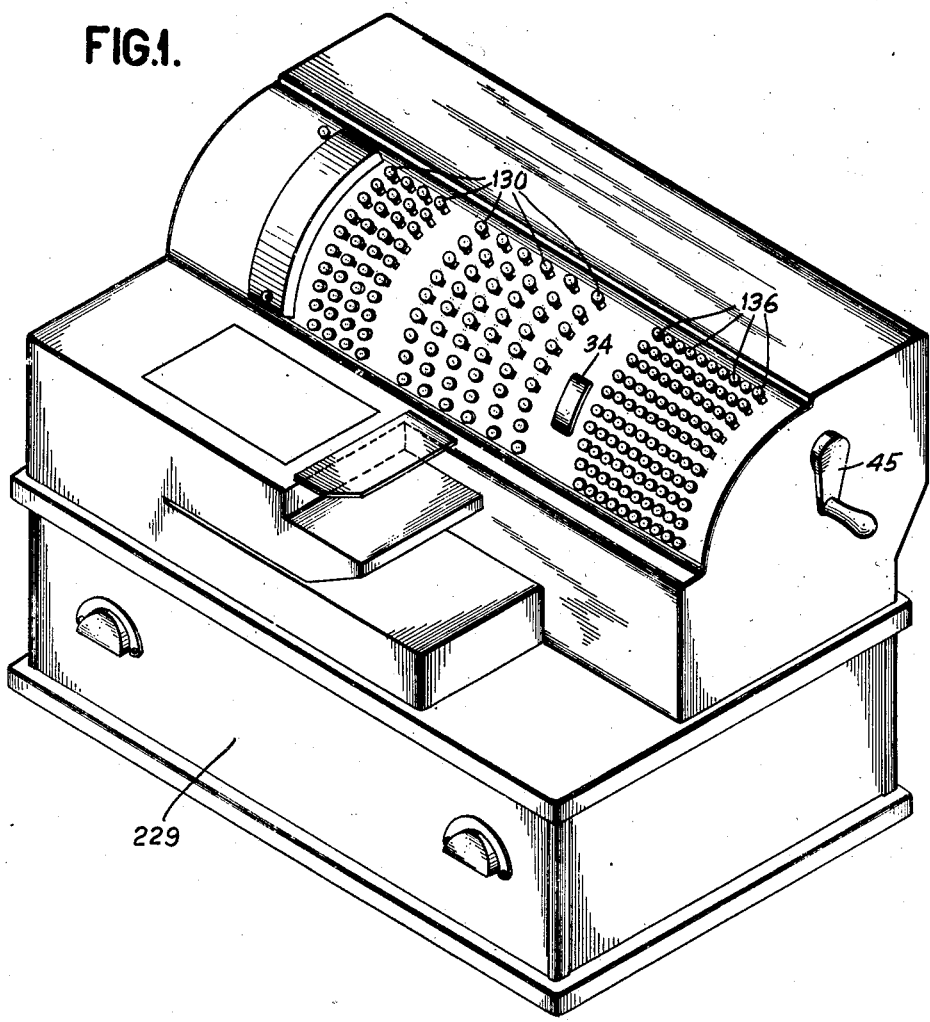
Fig. 1 is a perspective view of the entire machine.

The present improvement is preferably illustrated in connection with a cash register fully shown and disclosed in the patent to B. M. Shipley No. 1,619,796, dated March 1, 1927 which refers to lines 1–11 of page 4 back to Patent No. 1,144,418 for the motor-clutch and its release bar on the keyboard. The keyboard, however, is slightly changed over that disclosed in the patent and comprises, as shown in Fig. 1 of the present drawings, ten banks of amount keys 130 and also comprises, as disclosed in the aforementioned patent, ten banks of ledger keys 136, also shown in Fig. 1 of the present drawings.

Figure 2:
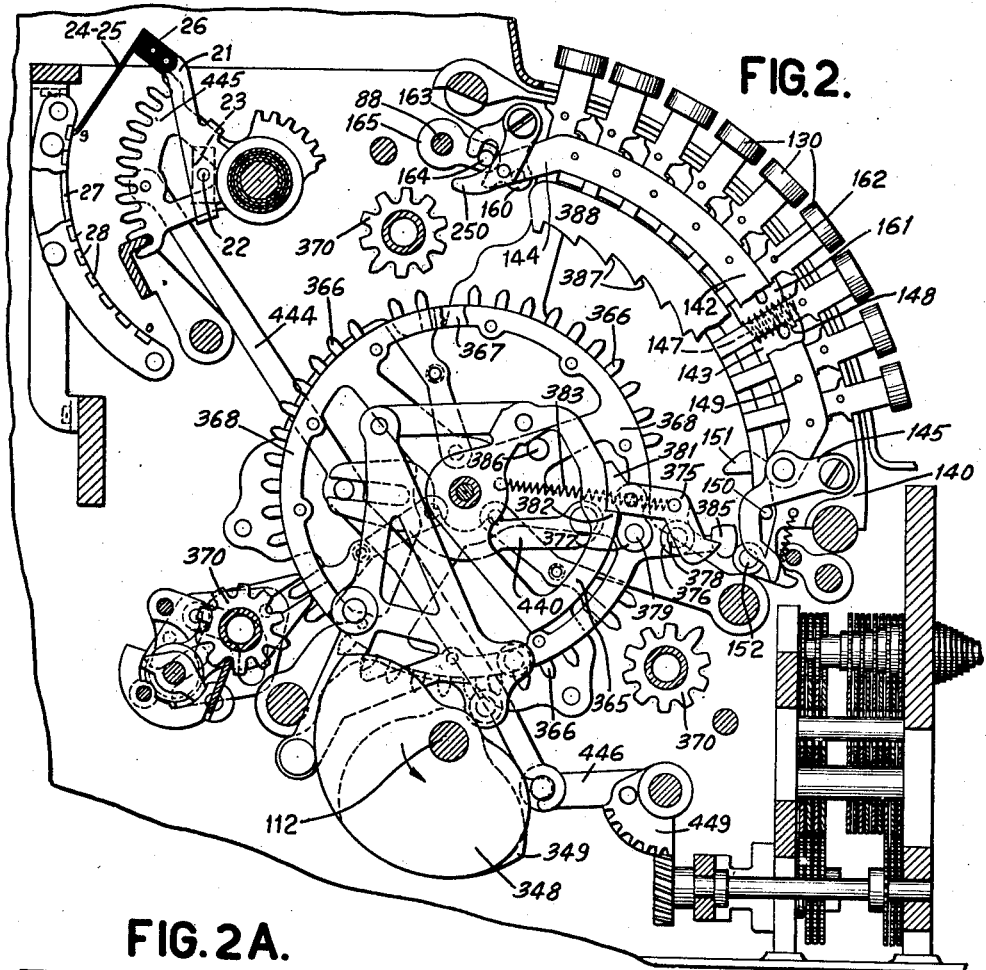
Fig. 2 is a cross section taken alongside of one of the amount key banks, the side cover and a part of the flexible detent being broken away to show the construction of the key banks.

The construction of the banks of amount keys 130 is shown in Fig. 2 of the present drawings and the last-mentioned figure corresponds to Fig. 8 of the aforementioned patent. In each bank of keys there is provided a series of nine keys which are arranged so as to be depressible exterior of the cash register and the construction whereby the keys may be locked in depressed position will now be explained with reference to Fig. 2 in which elements corresponding to those disclosed in the last-mentioned patent are identified by like reference numerals.

The keys 130 of each amount bank are slidably mounted in a supporting frame 140 and said keys are depressed against the action of compression springs 141.

When a selected key is depressed, the inclined edge 148 of a shoulder of the key will engage a corresponding pin 149 of the related detent plate 142, and it will move said detent downwardly until the shoulder 148 has passed the pin, thereby locking the key in depressed position. The lower arm 145 which supports the detent plate 142 engages a pin 150 carried by an L-shaped arm secured to rock shaft 152 and upon which a zero stop pawl 151 is mounted. The downward movement of the detent 142 through the arm 145 and pin 150 rocks the zero stop pawl 151 clockwise to an ineffective position as long as the key is depressed and such zero stop pawl releases the differential mechanism of the associated bank to thereby set said elements in a differential position in accordance with the particular key depressed.

Each key bank is also provided with a locking plate 143 which has extensions 161 which pass over pins 162 of the depressed key 130 and beneath the pins 162 of the undepressed keys in that bank. In order to give the locking plate 143 the required upward movement to effect the locking action just described, its upper supporting arm 160 has a hook 163 engaging a rod 164 carried by arms 165 fastened on the shaft 88. This shaft 88 is rocked counterclockwise upon the depression of the motor release bar as will be hereinafter described whereupon the rod 164 lifts the locking plate 143 into locking position.

Differential mechanism

The differential mechanism of the machine shown in the patent is employed to differentially operate different totalizers and also to select type carriers in the printing mechanisms to print the amounts entered in the machine. The differential mechanism in the present improvement is employed to cause the punching of amounts so as to represent the amounts entered in the different totalizers and printed by the type carriers of the printing mechanism.

A differential mechanism is employed for each bank of keys and in view of the similarity in construction and operation of the differential mechanism the description will be given in connection with a single order which is fully disclosed in Fig. 2.

Each order includes segment 365 which is reciprocated by means of cams 348 and 349 for each operation of the machine and as viewed in Fig. 2, this movement of the segment 365 is first counterclockwise and then clockwise to its normal position. Circular plates 367 and 368 carry three movable segments 366 and which segments operate the totalizer pinions 370. The plates 367 and 368 are connected to the invariably moved segment 365 by a latch 375 carried by arms 376 and 377 pivoted at 378 and 379, respectively, to the plates 367 and 368. A foot 381 of the latch 375 is normally held in engagement with a shoulder 382 of the segment 365 by means of a spring 383.

By the above described latch connection, the plates 367 and 368 and segments 366 are rotated counterclockwise, Fig. 2, until an arm 385 integral with an arm 376 strikes the end of a depressed key. When this occurs the arms 385, 376 and 377 are rotated clockwise thereby disengaging the foot 381 from the shoulder 382. This causes the breaking of the latch and the forward end thereof engages a notch 387 opposite the depressed key. There are ten notches 387 in the plate 388 one for each of the nine keys, one at the zero position.

Obviously, after the latch has been broken, the segment 365 will continue its counterclockwise rotation but the segments 366 will remain in their differentially set position. When the segment 365 is reversely rocked or in clockwise direction, as viewed in Fig. 2, the segment 365 will engage a pin 386 carried by the plates 367 and 368 thereby reversely rotating said plates to their normal positions during which time the segments 366 actuate the totalizer pinions 370.

More fully shown and described in the patent to Shipley No. 1,619,796, a beam 440 is adapted to position a link 444 and thereby differentially position an arm 446 and by means of said arm position a segment 449 which is adapted to differentially set the type of the printing mechanism so as to print an amount commensurate with the value entered in the machine by the depressed keys.

The upper end of the link 444 is pivoted to a segment 445 which is adapted to set certain parts of the indicating mechanism fully shown and described in the patent to Shipley. As will be more fully described hereinafter, the segment 445 is adapted to set a switch contact member of an electrical punch selecting mechanism.

*Differential mechanism for ledger key banks*

Figure 3:
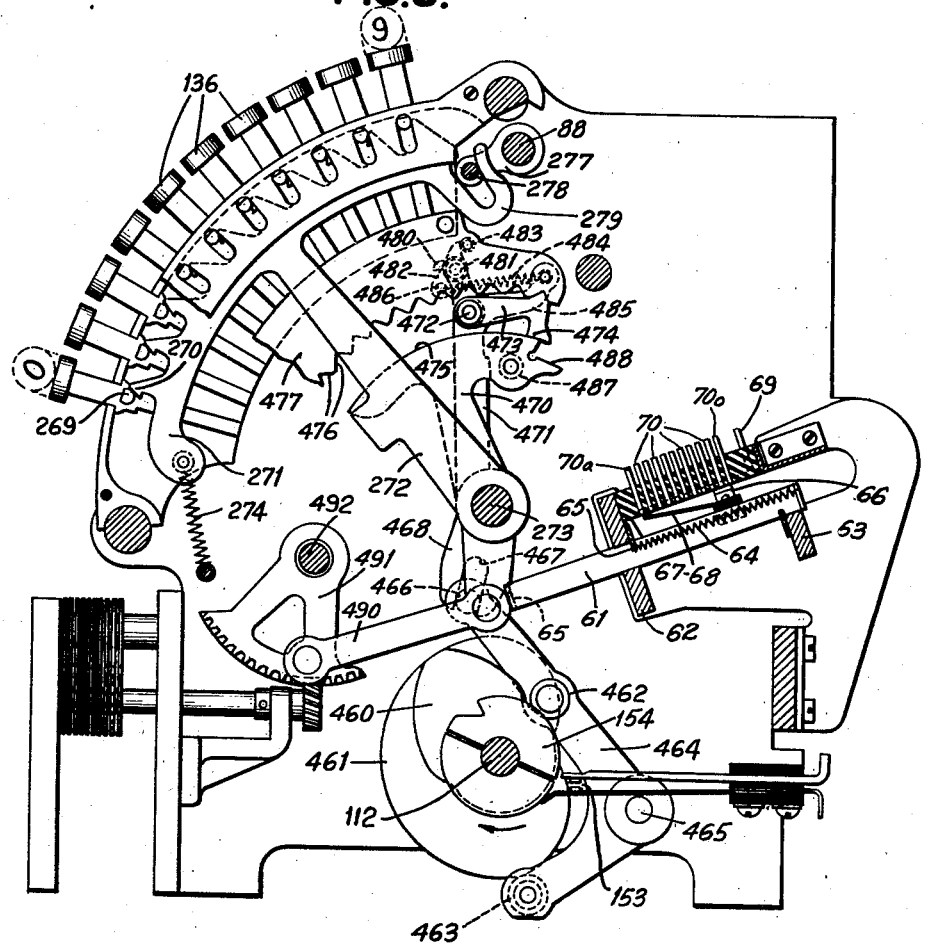
Fig. 3 is a cross section taken alongside of one of the ledger key banks.

As previously intimated, the machine also includes ten banks of ledger keys 136 and each of the banks of keys is adapted to control a differential mechanism, the construction of which is shown in Fig. 3 for one bank of keys. Each bank of ledger keys comprises as shown in Fig. 3 ten keys and in such banks of keys the "0" key is depressed so as to cause the printing of "0". This differentiates the operation from operation of the banks of amount keys 130 since no "0" key is utilized in the amount key banks. The differential mechanism for the ledger key banks is adapted to effect the setting of ledger number printing devices so as to print the ledger numbers and by means of the present improvements a punch selecting mechanism is associated with each of the banks of ledger keys 136 so as to effect the selection of punches to punch a number corresponding to the depressed ledger keys.

The construction and operation of the differential mechanism is somewhat similar in principle of operation to the differential mechanism employed for the amount key banks but differs in a number of details of construction and in operation. For this reason, a detailed description will be given of the differential mechanism for the ledger key banks.

The differential mechanism for the ledger key banks is driven by a pair of cams 460 and 461 (Fig. 3) cooperating with rollers 462 and 463, respectively, on a lever 464 pivoted on a stud 465. The lever 464 carries a pin 466 projecting into a slot 467 in an arm 468 fast on a shaft 273.

Clockwise movement of the cams 460 and 461 rocks the lever 464 first clockwise and then counterclockwise whereby the arm 468 and shaft 273 are rocked first counterclockwise and then clockwise to normal position. Secured to the shaft 273, for each bank of keys is a member 470. Associated with each member 470 is a lever 471 loose on the shaft 273. Pivoted on a stud 472 on the lever 471 is a latch 473 having a foot 474 normally resting upon the periphery 475 of the member 470. The upper edge of the latch is normally in engagement with a notch 476 of a plate 477. Rigid with the latch 473 is an arm 480. Pivoted on a stud 481 on the arm 480 is a pawl 482 normally in engagement with a pin 483 on the plate 477. A spring 484 stretched between an arm 485 integral with the lever 471 and a pin 486 on the pawl 482 holds said pin in engagement with the arm 480 of the latch 473. In Fig. 3 the latch is shown engaging the notch 476 in the eleventh or highest position. This is the normal position of the parts when there has been no key 136 depressed in the bank.

Counterclockwise movement of the shaft 273 rocks the member 470 counterclockwise whereby a pin 487 carried thereby engages the lever 471 and rocks said lever counterclockwise. As the pin 487 engages the lever 471 the spring 484 rocks the latch 473 so that its foot 474 rests upon a portion 488 of the member 470. This counterclockwise movement of the member 470 occurs immediately after the beginning of the operation of the machine. If one of the keys 136 is depressed as the lever 471 is moved counterclockwise, the upper end of the pawl 482 engages the end of the depressed key, whereby said pawl is rocked slightly clockwise until it is past the key, whereupon the spring 484 returns the pawl so that the pin 486 again engages the arm 480.

When the clockwise movement of the member 470 to normal position is started the foot 474 is on the portion 488 of said member. During this movement of the member 470, if there has been a key 136 depressed, the upper end of the pawl 482 engages the end of the depressed key. This time, however, the pawl does not rock as the pin 486 is in engagement with the arm 480 thereby preventing any independent rocking of the pawl 482. As the arm 480 is rigid with the latch 473, the engagement of said pawl with the depressed key rocks the pawl 482 and latch 473 counterclockwise as a unit, around the stud 472 thereby disengaging the foot 474 from the portion 488 whereby the upper end of the latch 473 engages the notch 476 appropriate to the key which has been depressed. After the latch 473 is disengaged from the member 470 said member continues its clockwise movement to normal position. Upon the next operation of the machine the member 470 is rocked counterclockwise and the pin 487 picks up the lever 471 where it may have been left at the preceding operation and carries it downward to its farthest position and then rocks it clockwise again, through the latch 473, until said latch is broken by the end of the depressed key or, if no key has been depressed, broken by the pin 483 on the plate 477. Thus it can be seen that the member 471 is differentially positioned according to the key depressed.

Pivoted to each of the levers 471 is a link 490, also pivoted to a spiral segment 491 loose on a rod 492. Through the link 490 and segment 491 the ledger number printing device is set differentially under the control of the ledger number keys 136.

Motor release bar

Figure 6:
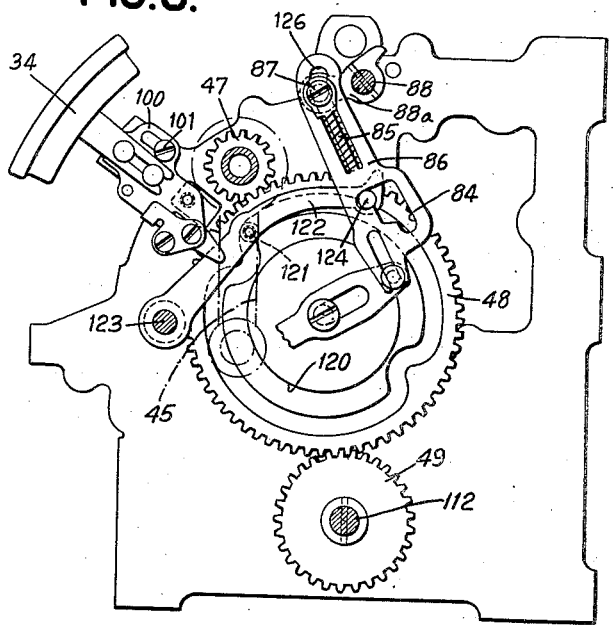
Fig. 6 is a side elevation showing certain parts which are pertinent to the operation of the release shaft and the motor release bar.

It is customary to provide means to normally lock the machine against operation in the event that the machine is operated by a crank handle, and also in motor operated machines to release the motor for operation and such means is placed under control of a motor release bar 34, Figs. 1 and 6. The lock for the motor release shaft 88 includes a detent 91, Figs. 4 and 7, journaled on a suitably supported shaft 92, a spring 127 holding the free end of the detent in the path of a stud 89, Fig. 4, projecting laterally from a locking arm 90 fast on a release shaft 88.

The release shaft 88 carries an arm 88a, Fig. 6, having a stud 87 projecting into a slot 126 in a link 86. This link also has formed therein an opening 84 through which projects a pin 124 carried by an arm 122 journaled at 123 to support the link. A strong spring 85 mounted on slides in the slot 126 presses upwardly against the stud 87 of the arm 88a on the release shaft 88, to rock the latter clockwise.

Figure 4:
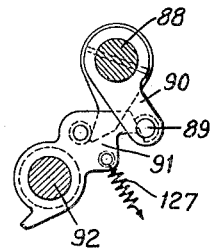
Fig. 4 is a detail view showing the means for normally locking the release shaft against operation.

The operation of the release shaft 88 by the spring 85 is normally prevented by the contact of the locking detent 91, Fig. 4, with the stud 89 carried by the locking arm 90.

This lock is controlled by the motor release bar 34, Fig. 6, removably mounted on the upper slide 100 which is slotted to accommodate the guide pins 101.

Figure 7:
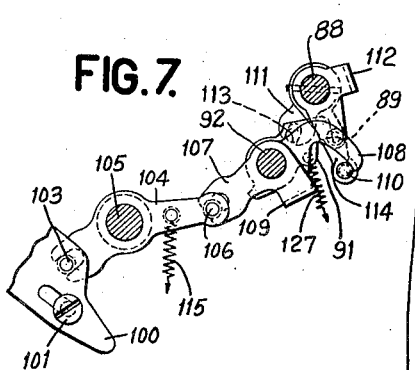
Fig. 7 is a detail view showing in side elevation the train of mechanism from the motor release bar to the locking mechanism for the release shaft.

A pin 103, Fig. 7, on the slide 100 seats in a bifurcation at one end of an intermediate lever 104 pivotally supported on a stud 105, the opposite end of the intermediate lever 104 carrying a pin 106 entered in a bifurcation formed in the arm 107 of a bail 109 journaled on the shaft 92.

The remaining arm 108 of the bail 109 is hooked to take over a stud 110 on the arm 114 of a second bail 112 journaled on the release shaft 88, the remaining arm 111 of such second-named bail 112 being forked to engage a stud 113 on the machine locking detent 91.

Obviously, the depression of the motor release bar 34 and its slide 100 will rock the intermediate lever 104 against the tension of its restoring spring 115, and the lever 104 through bails 109 and 112 will displace the locking detent 91, Fig. 4, from the path of the stud 89 on the locking arm 90 fast on the release shaft 88.

Thereupon the spring 85, Fig. 6, rocks the arm 88a and release shaft 88 clockwise to one limit of its travel, the stud 87 being shifted to the upper end of the slot 126 in the link 86.

In motor driven machines the release shaft 88, as more fully disclosed and described in the patent to Shipley, No. 1,619,796 and as will be explained in more detail hereinafter, operates to depress the clutch detent and free the motor for operation, the motor driving the shaft 112, Fig. 6, to one rotation.

In crank operated machines the operator after depressing the motor release bar 34 actuates the crank handle 45, Fig. 1, through two rotations which through a train of gears 47, 48 and 49, Fig. 6, imparts a single rotation to the shaft 112.

Locking of amount keys by release of machine

The depression of the motor release bar causes the locking of the undepressed keys and the depressed keys in the amount key banks and such is effected by the following described means.

For the amount key banks, referring particularly to Fig. 2, it will be seen that when the release shaft 88 is rocked counterclockwise effected upon the depression of the motor release bar, the rod 164 will lift the locking plates 143 of the amount key banks, thereby locking the keys which have been depressed and rendering the keys which have not been depressed locked during the remaining part of the operation of the machine.

Automatic release of keys at the end of the operation of the machine

Near the end of the operation of the machine, the shaft 88 is rocked counterclockwise, Fig. 6, beyond normal position by the link 86 which is lowered to cause the upper end of the slot 126 in the link 84 to strike the stud 87. This movement of the shaft 88 beyond its normal position is for the purpose of releasing both the depressed amount and ledger keys so that said keys may be restored to normal position by the usual key return springs. Thereafter the link 86 is again raised which latter movement permits the shaft 88 to return to normal position by the action of the spring 85. The opening 84 in the link 86 has an offset into which projects the pin 124 on the lever 122. The lever 122 has a roller 121 cooperating with a cam race 120 in the gear 48 and this cam race 120 rocks the lever 122 clockwise to lower and raise the link 86 as above described.

As previously described the rod 164 (Fig. 2) is carried by arms 165 fast on the release shaft 88 and as said rod is lowered past normal position by the clockwise rotation of shaft 88 (Fig. 2) the rod engages projections 250 on the arms 144 supporting the upper end of the detents 142 and forces the detents downward. The locking plate 143 is moved to normal position by this downward rocking of the rod 164 before said rod passes its normal position and said plate is retained in normal position during the continued movement of the rod 164 past normal position so that the return springs 147 are permitted to release the depressed keys to undepressed position.

At the same time the amount keys are released, the ledger keys 136 (Fig. 3) are also released at the same time. For accomplishing the release of the keys 136 there is provided two arms 277 which carry a rod 278 engaging a hook 279 integral with a detent plate 271 integral with an arms 272. When the shaft 88 is moved counterclockwise to release the amount keys the rod 278 through its engagement with the hook 279 rocks the plate 271 and arm 272 clockwise thereby disengaging the projection 270 from the pin 269 of the depressed ledger key permitting the return spring (not shown) to return the depressed key 136 to normal after which the release shaft 88 is rocked clockwise to normal thereby allowing a spring 274 to return the detent plate 271 and arm 272 to normal.

Motor drive

As previously indicated the machine may be operated by an electric motor which is of a well known type fully illustrated and described in the U. S. Patent No. 1,144,418 granted to C. F. Kettering and W. A. Chryst, dated June 29, 1915. For a detailed description of the same reference may be had to this patent. Only a part of the motor clutch mechanism is shown herein and for a better understanding of the operation of the machine the following description is given to understand how the operation of the motor release bar releases the motor for operation.

The motor is mounted on the left side of the machine and is connected to the driving mechanism of the machine by a clutch. This clutch includes a shell 40 (Fig. 5) which is driven by the motor. Rotatably mounted in the frame of the machine is a shaft 52 carrying a disc 53 having notches 54 in which are rollers 55 loosely mounted on pins 56 carried by a disc 57 loose on the shaft 52. These rollers are forced away from the shorter sides of the notches by spring-pressed pins 58 carried by disc 53. It is evident that when shell 40 is rotated clockwise, Fig. 5, by the motor, the rollers 55, when the disc is released, will wedge between the longer side of the notches 54 of the disc 53 on the inner periphery of the shell 40 and will cause the disc 57 to rotate with the shell 40 in a counterclockwise direction. Fixed on shaft 52 is a pinion 59, the teeth of which engage the teeth of a gear 60a loose on a stud mounted in a side frame. This gear 60a meshes with a gear 61 fast on the main drive shaft 112 hereinbefore referred to. This shaft receives one complete rotation at each adding operation.

Figure 5:
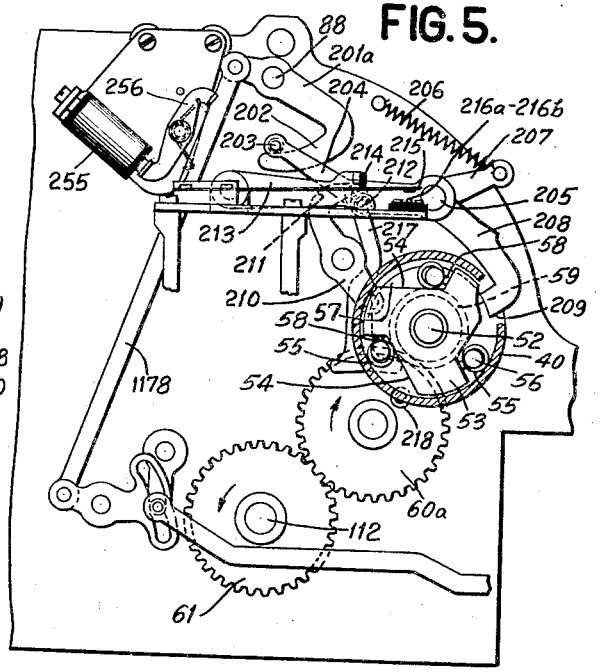
Fig. 5 is a side elevation of the cash register with the motor removed to show the clutch, the switch and the driving mechanism.

When the release shaft is rocked counterclockwise, as seen in Fig. 5, an arm 201a, having a hook 202 normally under a roller 203 carried by arm 204 of a lever 208 pivoted at 205 is moved away from under said roller, which permits said arm 204 to be rocked counterclockwise under the influence of a spring 206 extending between an arm 207 integral with arm 204 and a stud on the side frame. The lever 208 is normally in engagement with a shoulder 209 formed on disc 57 and a shoulder on a disc (not shown) secured to the shaft 52. As arm 208 is integral with arm 204 it will be rocked counterclockwise out of locking position upon the movement of the release shaft and will thereby permit the shaft 112 to be rotated by the motor when the electrical contact controlling the motor is made.

Behind the disc 57 (Fig. 5) is another disc (not shown), loose on the shaft 52, which is normally under spring-tension and which, when released by the movement of the locking lever 208, rocks a lever 210 by means of a cam surface on its periphery. The lever 210 has an arm 211 which cooperates with a roller 212 carried by an arm 213 and rocks said arm clockwise (Fig. 5). This arm has a projection which carries insulating material 214 and when said arm 213 is rocked as above described the insulating material 214 engages and depresses two spring contacts 215 far enough to make contact with two stationary contacts 216a and 216b (Fig. 5). The circuit through the motor is thereby closed and the motor operated.

Just before the end of the operation the before-mentioned disc which closes the motor circuit is arrested, thereby permitting the lever 210 to be rocked counterclockwise as the spring contacts move to break the circuit. Pivoted to arm 204 is a depending inverted T-shaped arm 217 which at its lower end cooperates with a roller 218 carried by gear 60a. Near the end of the operation the roller 218 comes into contact with the lower end of an arm 217 and raises it, thereby rocking arm 204 and lever 208 clockwise. This brings the end of lever 208 into the path of shoulder 209 and when they come in contact the clutch connection is separated and the drive shaft stopped in its normal position. The hook 202 is returned to its normal position at the end of the operation and assumes its position beneath roller 203 on arm 204 and maintains this arm and lever 208 in their normal positions.

Punch selecting mechanism

As previously intimated, the banks of amount keys and banks of ledger keys are adapted by means of a punching mechanism, to be hereinafter described in detail, to punch a tabulating card, one form of which is illustrated in Fig. 2A. The means whereby the differential mechanisms of the amount and ledger key banks electrically select the punches for punching representations of digits in the tabulating card will now be described.

With particular reference to Fig. 2, it will be recalled that there has been a previous reference to a segment 445 which is adapted to be set by the differential mechanism of the amount key banks so as to select appropriate indicators. As more fully disclosed in the patent to Shipley No. 1,619,796, the segment 445 is adapted to be retained in its differentially set position and which positioning was effected in accordance with the previous depression of the amount keys 130. Advantage is taken of the provision of the position of segment 445 and its particular manner of positioning to select the punch controlling instrumentalities. As is shown in Fig. 2, a switch carrying member 21 is secured to the segment 445 by any suitable means such as a fastening screw 22, which passes through a plate 23 positioned at one side of the segment 445 and also into the member 21 which is positioned at the opposite side of the segment 445. The member 21, therefore, partakes of the same differential movement as the segment 445. For each denominational order of the amount key banks there is provided a commutator arrangement which comprises a pair of brushes 24 and 25 which are carried by the switch member 21 by means of a bracket 26 of insulating material. As best shown in the wiring diagram in Fig. 8, the brush 25 is adapted to have a continuous electrical contact with a segment 27 while the brush 24 is adapted to contact with one of a plurality of contact bars 28. By the differential mechanism hereinbefore described the brush 24 is adapted to make electrical contact with one of the bars 28 while at the same time the brush 25 of the same key bank is in continuous electrical contact with the related segment 27. This construction is identical for each of the amount key banks and it is believed that the above description is sufficient for an understanding of this part of the construction of the machine. As best shown in the wiring diagram in Fig. 8 there is provided a series of ten digit representing bars 28 each of which has an electrical connection to a related punch control magnet 29 by means of a wire 30. The wires 30 are in a cable 30a (Fig. 9) and are flexible to permit the drawer in which the punching machine is assembled to be pulled out. Obviously, the position of the contact brushes 24—25 will select a particular punch control magnet 29 for energization so as to cause the operation of a related punch to punch a representation of a digit corresponding with the key depressed in the related bank. The manner in which punching operations are effected will be subsequently described.

A somewhat similar arrangement is provided for the ledger key banks so that the tabulating card may be punched to represent the same digits as the ledger keys depressed in the respective banks. The electrical punch selecting mechanism related to the ledger key banks is shown in Fig. 3. It will be recalled that the link 490 is adapted to be differentially positioned so as to select type carriers of the ledger number printing devices and retention of the differential positioning of the member 490 is utilized to effect the selection of punch magnets of the punching mechanism and is effected by the following described means.

For each bank of ledger keys there is provided a slidable bar 61 which is slidably mounted in bars 62 and 63 and by means of a spring 64 secured to the bar 61 a lug 65 thereof is adapted to be maintained against the right end of the member 490 and the slidable bar 61 thereby partakes of the differential movement given to the member 490. By means of a bracket 66, which is insulated from the bar 61, a pair of brushes 67, 68 for each order is carried thereby. The brush 67 in a manner similar to the amount key banks is adapted to make continuous contact with a column selecting bar 69, while the brush 67 by its differential position is adapted to make contact with one of the bars 70 which are wired to the digit representing bars 28 and thereby select the appropriate punch magnet.

Reverting now to the punch selecting mechanism for the amount key bank it will be noted that for such banks of keys no "0" key is utilized and the differential mechanism therefor will, as stated in the Shipley Patent No. 1,619,796, break the latch at the zero position permitting the brush 24 to make contact with the "0" bar 28 and causing the punching of a "0" in the event that no key in an amount bank is depressed.

Now reverting to the description for the ledger key banks, it will be seen that a "0" key is employed and in this case the differential mechanism, and accordingly, the member 490, will receive its maximum amount of movement causing the brush 67 to make contact with the "0" bar designated as 70o. However, in some instances it may be undesirable to require depression of all the "0" ledger keys 136 to effect the punching of "0's" in the tabulating card and in the present arrangement this is preferably effected by providing the commutators for the ledger key banks with an additional bar 70a which has a wire connection 71 to the "0" bar 28. In the event that no key in a ledger bank is depressed the differential mechanism will be retained in the position shown in Fig. 3 so that as a result of the normal contact of the brush 67 with the bar 70a the "0" punch magnet 29 will be selected for operation when no key in a ledger bank has been depressed.

The keys in the ledger bank are adapted to effect the punching of the tabulating card 95 shown in Fig. 2A in columns 17 to 26, inclusive, and the group of holes punched at the "0" index point position indicated by "A" in Fig. 2A indicates the manner in which "0" perforations are made in columns of the tabulating card in which no keys of the related ledger banks are depressed.

*Punching machine*

The punching machine which is coordinated with the cash register and shown in the present application is preferably of the type which is well known in the art and is fully shown and described in the patent to F. Lee et al., No. 1,976,618, dated October 9, 1934. Only so much as is necessary to understand the coordination of the punching machine with the cash register and the general operation of the punching machine will be explained herein.

Referring to the wiring diagram shown in Fig. 8 electrical power for operating the cash register is provided for by the insertion of a plug cord 31 in a suitable receptacle having connections to a power supply. This will transmit current to a positive line side 32 and to a negative line side 33 of the cash register. When a switch 35 is closed, current is transmitted to a positive line side 38 and to a negative line side 39 of the punching machine.

The normal condition of the punching machine is with tabulating cards 95 to be punched in a supply hopper 41, (Fig. 9) of the punching machine and with cards therein card lever contacts 41 (Fig. 8) in the punching machine are closed by a card operated lever 42. The last described elements are of a well known type and common in punching machines of the type referred to herein.

Also in the normal condition of the punching machine contacts 135 are also closed when the card carriage is positioned to the first column punching position. The means whereby such contacts are closed is fully shown and described in the aforementioned patent to Lee et al., 1,976,618 and such contacts are identified by the same reference numeral.

After an amount and a ledger number is set upon the keyboard of the cash register the motor release bar 34 is depressed which causes the release of the clutch and the motor of the cash register is set into operation by a circuit now to be described.

When the motor clutch is released it will be recalled that contacts 215—216a, and supplemental contacts 215—216b (Fig. 5) will be closed, and when contacts 215—216a are closed a circuit is closed from the positive line side 38, to a magnet 37 of a motor control relay, the circuit extending from such magnet 37 through card lever contacts 41, first column control contacts 135 now closed, to contacts 215—216a, to the negative line side 39 thereby effecting the energization of the magnet 37 and the closure of relay contacts 37b which are located in the punching machine. A circuit is then closed from the positive line side 32 through contacts 215—216b, from said contacts to the relay contacts 37b, through the motor 16 of the cash register and thence to the negative line side 33 thereby causing the motor of the cash register to be operated.

After the differential mechanism has been set in accordance with the newly depressed amount and ledger keys and the movable switch contacts of the related commutators have been differentially set and retained in differentially set position, contacts 153 (Fig. 3) are closed by means of a cam 154 which is carried by the main drive shaft 112, thereby initiating the operation of the punching machine by a circuit to be subsequently described in detail.

Attention is directed to the provision of the so-called column selector shown in Fig. 8 which comprises a stationary contact strip 116 and a movable contact brush 117 which moves step by step as the succeeding card columns are punched. The column selector shown at the bottom of the left side of Fig. 8 comprising in part, the strip 116, movable brush 117 and column contacts 118, is well known in the art and is fully described in the patent to G. F. Daly et al. No. 2,016,706, dated October 8, 1935.

The machine preferably has provisions for punching in the first six columns of the tabulating card shown in Fig. 2A, data which designates the date of the transactions and such data is manually set up by the operator so as to successively punch a series of cards with the same date. In the card shown in Fig. 2A the date is punched to represent in columns 1—6 the tenth month, the twelfth day and thirty-seventh year. To automatically effect such punching operations the punching magnets 29 have wire connections 119 to plug sockets 120 of a plugboard. The column contacts 118 related to the first six card columns have wire connections 128 to plug sockets 129. By means of plug connections 131, which are shown for the example herein given, the appropriate punch magnets 29 will be selected under control of the column selector 116—117—118, as is well understood.

Attention is directed to the fact that the contacts 135 will permit the operation of the cash register only when the card carriage of the punching machine is positioned in the first card column, and furthermore, the card operated contacts 41 will not permit the energization of the motor relay magnet 37 unless there is a card in the supply hopper of the punching machine. Hence the cash register cannot be operated unless the punching machine is in a condition so as to effect the punching of a tabulating card.

The stick relay contact 37a closed by the energization of magnet 37 of the motor relay retains the energization of magnet 37 after the column selector has moved past the first column position and retains said magnet continuously energized until contacts 216a are opened at the end of the cycle of operation of the cash register.

The punch initiating circuit extends from the line side 39 through the cam controlled contacts 153, through a magnet 133 of a punch control relay, through last card column contacts 134 to the other line side 38 thereby causing, when cam controlled contacts 153 close, the energization of the magnet 133. Said magnet causes the closure of relay contacts 133a thereby extending the positive line side to the punch control magnets 29 by a circuit now to be described: from the positive line side 38, a wire 137, to contacts 138, now closed, and from said contacts 138 to the relay contacts 133a, thence through contacts 139 to the common contact bar 116 of the punch selector, thence through the movable brush contact element 117 of the column selector to the first column contact 118 when punching is effected in the first column, thereby causing the energization of the selected punch magnet 29, it being noted that there is a common wire connection 141 from all of the punch controlling magnets to the negative line side 39.

Reference has been made to contacts 134 and such contacts correspond to contacts 191 in the Patent No. 1,976,618, and the function and operation of said contacts 191 is clearly explained therein. As shown in Fig. 8 contacts 134 are normally closed but are opened by the card carriage when the latter is at the last column punching position. The contacts referred to herein by numeral 138 correspond to the contacts identified by the numeral 136 in the last-mentioned patent and reference may be had to said patent for a more complete disclosure of its function and operation. Contacts referred to herein as contacts 139 correspond to the same numbered contacts of the last-mentioned patent, and such patent gives a more complete disclosure of the function and operation thereof.

Figure 9:
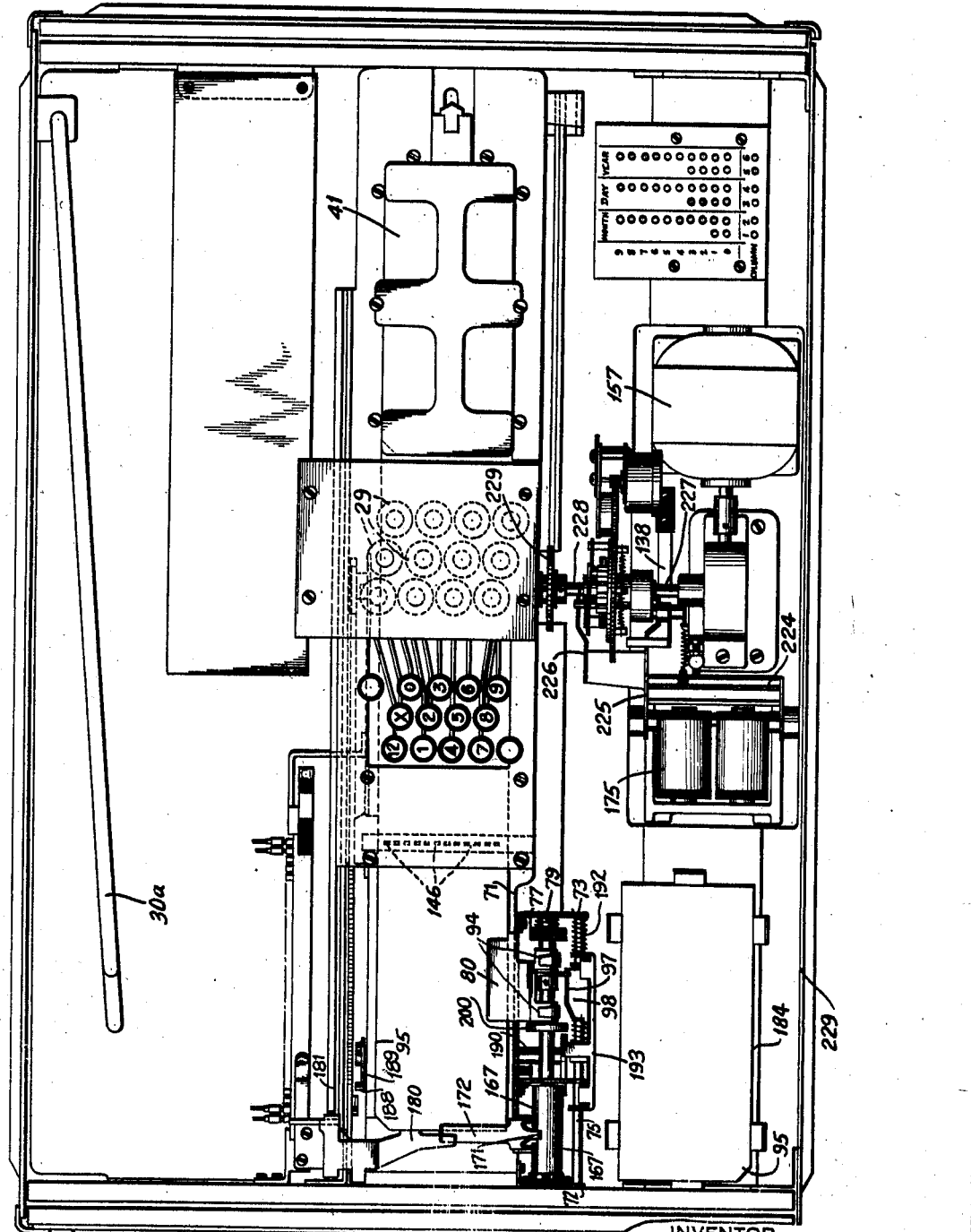
Fig. 9 is a plan view showing the tabulating card punching machine assembled within the usual cash drawer of the cash register.

The manner of effecting actual punching operations by means of a group of punches 146, generally shown in Fig. 9 is well known and fully shown in the Patent No. 1,976,618, need not be described in detail herein. As fully explained in said patent, the energization of one of the punch magnets 29 causes the depression of the coordinated punch 146 whereupon an escapement mechanism is operative to move the card carriage the position of one card column at which time the movable column selector contacts 117 will cause the closure of the circuit to the next selected punch magnet and the punching of the second column will then be effected.

Punching operations are effected automatically column by column until the twenty-sixth column of the tabulating card (see Fig. 2A) is punched after which the card carriage is automatically skipped to the last column position.

By means of a column skip bar (corresponding to the column skip bar 152 shown in Figs. 13 and 14 of the patent to Lee, No. 1,976,618) the card carriage is automatically skipped to the last or the eightieth card column position. When the card carriage is positioned at the last card column position contacts 134 (Fig. 8) are now open thereby deenergizing the punch control relay magnet 133 thus terminating punching operations and preventing further punching operations under control of the cash register until the carriage has been returned to the first card column position, by means to be subsequently described.

As will be more fully described hereinafter in detail at the last card column position the card carriage releases a card shifting mechanism which shifts cards out of the punching position and then by means of an ejector the punched card is flipped out of card punching position and into a supply hopper. When the card is in the flipped position, by means to be later described, contacts 201 are closed to cause the energization of a clutch control magnet 175. The energization of this magnet will thereupon open contacts 138 and cause the closure of contacts 190 which thereupon close the circuit to a motor 157. The numerals 201, 175, 190, and 157 herein identify the same elements as in the patent to Lee 1,976,618 and the operation is substantially the same as disclosed therein. The operation of the motor 157 causes the return of the card carriage to the first card column position.

*Interlocking devices*

While the above described mechanism is practically operative, it is desirable in order to prevent improper operations which may be effected either accidentally or intentionally to provide the machine with machine controlling devices which are in the nature of precautionary devices which insure the proper operation of the machine regardless of the operations attempted by the operator.

From Fig. 8, it will be noted that the relay magnet 133 is provided with relay contacts 133a' which are holding contacts for said relay and retain the magnet 133 energized as well as a control magnet 255, which is located in the cash register, and which is in series circuit connection with the relay contacts 133a', magnet 133, and the last column contacts 134. It is obvious, therefore, that as long as punching operations are effected magnet 255 will be held energized. The function of the magnet 255 will best be understood by a reference to Fig. 5 of the drawings herein in which it will be seen that the magnet 255, when energized, attracts its armature so as to rock a double arm 256, and when the double arm is rocked it will engage a notch in a member designated by reference numeral 1178 and which corresponds to a like numbered element shown in Fig. 2 in the Shipley Patent No. 1,619,- 796. The locking of the member 1178 during the punching operations will, since it is pivoted to arm 201a which is secured to shaft 88, hold and lock the shaft 88 in its normal position so that even if the cycle of the cash register has completed its operation with the motor clutch shown in Fig. 5 restored to normal latch position, the subsequent depression of the motor release bar 34 will be ineffective to release the motor release shaft 88. It will then be necessary for the operator to withhold the entry of a subsequent amount in the cash register by the depression of the motor release bar 34 until successive punching operations have been completed for the preceding amount.

In cash registers of the type shown in the Shipley Patent No. 1,619,796, the motor therein coasts for some time after the motor clutch has been latched up in normal position at which time the armature of said motor is free to rotate. It will be obvious, therefore, that if the above described means were not provided the re-engagement of the motor clutch caused by a subsequent depression of motor release bar 34 would enable the spinning armature of the motor to operate the main driving shaft 112 of the cash register and move the differential mechanisms out of their differentially set positions thereby causing false or improper punching operations. It is, of course, evident from Fig. 8 that as long as contacts 135 shown therein are opened after the card carriage has moved beyond the first card column position the circuit to the motor 16 of the cash register cannot be closed, but since, however, the armature of the cash register coasts for a short time after the clutch has been relatched it will be evident that the locking of the release shaft 88 and rendering the motor release bar 34 ineffective in the manner just described effectively prevents the motor of the cash register from operating the cash register in an improper manner by utilizing the spinning of the armature even though means comprising contacts 135 prevents the circuit to the motor from being closed. The above two locks effectively prevent misoperations of the two distinct types.

Card ejecting device

Figure 10:
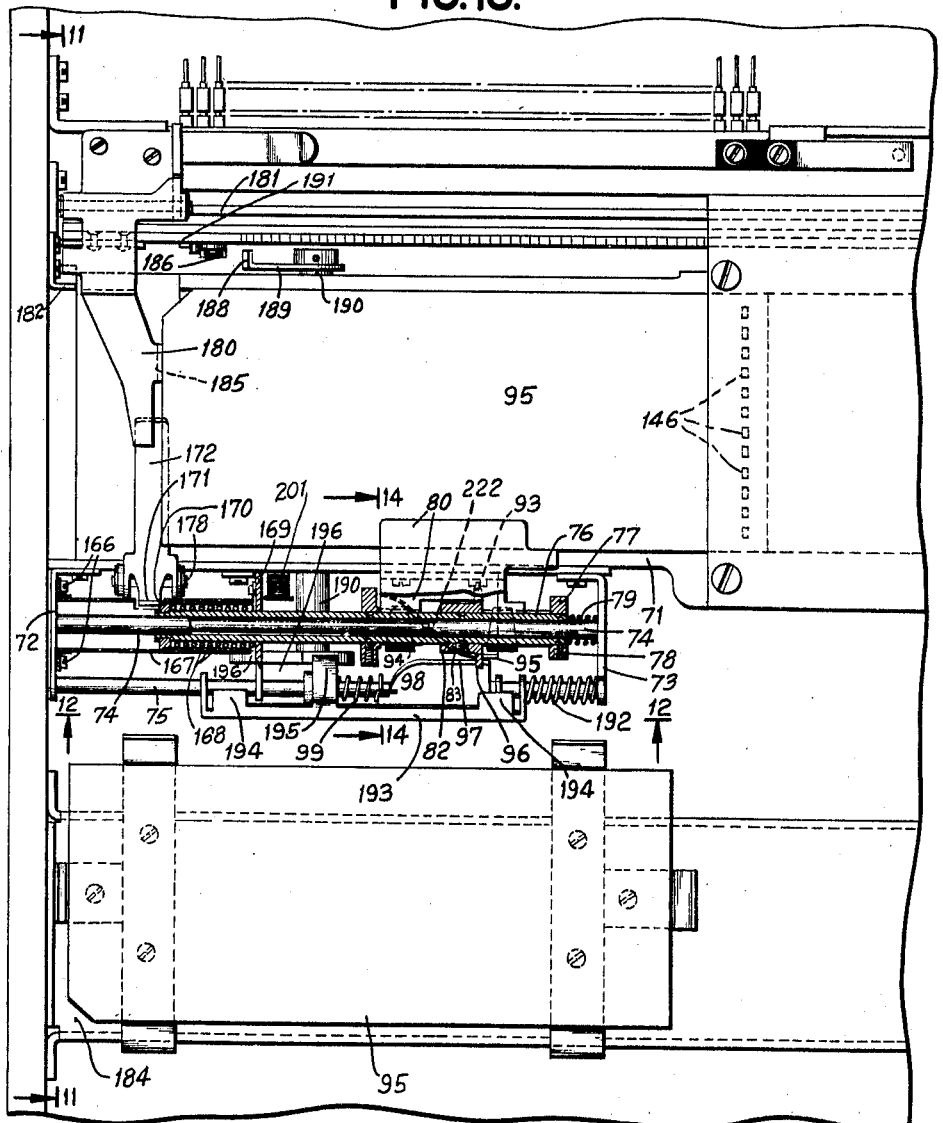
Fig. 10 is a plan view partially in section and taken on an enlarged scale with respect to Fig. 9 and shows the left end of the punching machine.

As best shown in Figs. 10, 11 and 12 to the side frame 71 of the punching machine there is secured a pair of brackets 72, 73 which carry supporting rods 74, 75. A tube 76 loosely surrounds the rod 74 and at its right end the tube 76 has fixed thereto a collar 77 the latter being adjustably fixed to the tube 76 by a set screw 78. One end of a coil spring 79 surrounding the rod 72 securely fits in the adjustable collar 77 and the other end of the coil spring 79 is secured to the side frame 73 and the tendency of the coil spring 79 is to rotate the rod 74 in a clockwise direction, as viewed in Figs. 11 and 14.

A pair of gripper plates 80 have their ends 81 curved around the tube 76 and are normally in the position shown in Figs. 10, 11 and 14 but are rocked by the rocking of tube 76 to the dotted line position shown in Fig. 14. Secured to the tube 76 is a collar 82 held to the tube by a set screw 83 (Fig. 10) and said collar has a projection 93 which, as shown in Fig. 14, is interposed between the gripper plates 80 to rock the plates 80 by the rocking of the tube 76. A coil spring 94 shown in Fig. 14 is fixed to the gripper plates 80 so as to rock them together and securely grip the punched tabulating card 95 as the latter is interposed between the gripper plates 80. A projection 96 of the collar 82 normally rests, as shown in Figs. 12 and 14, on the horizontal edge 97 of a cam plate 98 which is pivoted on the rod 75 and urged by a coil spring 99 to the position shown in Fig. 14.

Secured by screws 166 (Figs. 10 and 12) to the bracket 72 is a tube 167 and a coil spring 168 surrounds the tube 76 and is within the tube 167. One end of the spring 168 bears against a fixed bracket plate 169 which is apertured to receive the tube 76 and also bears against a collar 170 secured to the tube 76. The spring 168 urges the tube 76 and parts carried thereby to the left so that the gripper plates 80 seizing the punched card 95 shifts the punched card to the left clear of the punches 146, since in the last column punching position the card is not free of the punches or other guide plates of the punching machine.

The shifting of the card is normally prevented by a latching mechanism comprising an extension 171 of a pivoted release arm 172. The arm 172 is rocked by the following described means. The release arm 172 is pivoted by a stud 178 carried by a bracket 179 and at a certain time its rear end underlies an operating arm 180 which is pivoted on a rod 181 carried by the card carriage. The arm 180 carries a block 185 (Figs. 10 and 11) and the left edge of the tabulating card 95 bears against this block to align the card on the card carriage. When the card carriage is skipped to the last column position the arm 180 engages a fixed cam plate 182 (Fig. 11) which rocks the free end of arm 180 downwardly to lower block 185 out of engagement with the tabulating card and since the arm 180 now overlies, as shown in Fig. 10, the left end (Fig. 11) of the release arm 172 the latter will be rocked to release spring 168 for action so as to cause the punched card to be moved laterally over the card carriage entirely clear of the punches 146 and without obstruction by the block 185.

Projection 96 slides during this operation to the left (Fig. 12) until it reaches an inclined edge 183 of the plate 98 thus permitting spring 79 to rock the tube 76 and thus the ejector plates 80 are flipped during their lateral movement to the dotted line position placing the laterally shifted punched tabulating card over a storage hopper 184. The card is positively stripped from the ejector plates 80 by means now to be described.

Figure 10A:
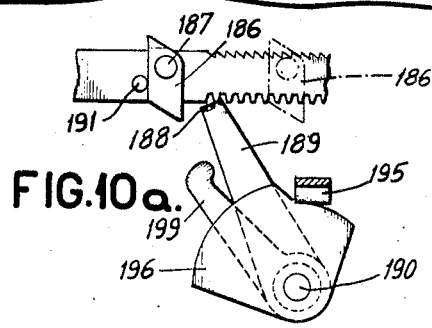
Fig. 10A is a detail view showing the coordination of certain of the operating parts of the punching machine.

As best shown in Fig. 10A the escapement rack of the card carriage carries a pawl 186 pivoted at 187 to the escapement rack. As the escapement rack and the card carriage moves laterally beyond the last column position as just described the pawl 186 will be moved from the dotted line position shown in Fig. 10A to the full line position shown in this figure and in so doing it will engage a lug 188 of an arm 189 secured to a rock shaft 190, and the pawl 186 will rock idly counterclockwise past the lug 188 and occupy the full line position. By means to be shortly described the escapement rack is moved to the right by the power restoration of the card carriage in the same direction so that pawl 186 will strike the lug 188 but since the pawl will now be prevented from rocking clockwise, since it engages a pin 191 carried by the escapement rack, the movement of the latter to the right will cause the rocking of the arm 189 and, therefore, the shaft 190.

Pivotally mounted on the rod 75 and urged by a coil spring 192 (Figs. 10 and 12) is a bail 193 which carries a pair of upstanding stripper fingers 194. When the card has been flipped in the manner just described the stripper fingers 194 will cooperate with one of the longer edges of the tabulating card. As best shown in Figs. 10 and 11 the bail 193 is provided with a bail extension 195 which cooperates with a profile cam 196 secured to the rock shaft 190. As the shaft 190 is rocked the cam 196 will rock the bail 193 and by means of the stripper fingers 195 positively remove the tabulating card out of cooperation with the ejector plates 80. In the operation of the machine the stripper fingers 194 are given a rapid operation so as to quickly strip the card from the ejector plates 80 so that the stripped card will fall freely into the storage hopper 184.

It was previously stated that when the ejector plates 80 are released for lateral movement, the lug 96 will slide along the horizontal edge 97 of the cam plate 98, and thereafter down the inclined cam edge 183 thereby causing the ejector plates to be rocked to the dotted line position shown in Fig. 14. When in the dotted line position the lug 96 will strike a lug 197 of a bracket 198 secured to the side frame 71 of the punching machine, in which position it will be entirely free of the cam plate 98. After the shaft 190 has been rocked to cause the stripper plates 194 to strip the flipped card from the ejector plates 80, arm 199 secured to the shaft 190 will strike a disc 200 secured to the tube 76 by a set screw 221 and engaging the side face of the disc 200 it will restore the tube 76 to the right, as viewed in Fig. 12. The lug 96 will thereupon engage a cam edge 222, Fig. 14, of the bracket plate 198 and the cam edge is spirally formed as best shown in Figs. 10 and 11, thereby causing the tube 76 to be reversely rocked. The lug 96 will, during this operation, be positioned underneath the cam plate 98 thereby rocking it clockwise as viewed in Fig. 14 until the lug 96 clears the horizontal edge 97 of the cam plate 98 thereby relatching the ejector plates 80 in normal position as shown in Fig. 14. The parts are now in the normal position, shown in Figs. 10, 11, 12, and 14, placing them in readiness for a subsequent card ejecting operation.

As best shown in Fig. 13, the disc 200, which as previously stated is fastened to the tube 76 which is moved laterally and also rocked in a clockwise direction as viewed in Fig. 13, is provided with a projection 223 which is adapted to engage a spring blade of contacts 201 thereby closing such contacts and a circuit, as will be subsequently described, to a motor 157 (Fig. 9) which causes the punch restoration of the punching carriage and by means of said punching carriage effects the rocking of the shaft 190 to perform the functions effected by the rocking of this shaft.

From what has been previously stated the closure of contacts 201, referring to Fig. 8, will effect the energization of the magnet 175, which is also shown in Fig. 9. The magnet 175 will thereby attract its armature 224 to rock an arm 225, which is diagrammatically shown in Fig. 8, to open contacts 138 and close contacts 190. The closure of the contacts 190 will close an electrical circuit to the motor 157. Contacts designated 190 herein correspond to contacts similarly designated in Fig. 1, of the patent to Lee et al., No. 1,976,618, and the same applies to the designation of the motor 157. The manner of opening contacts 138 (corresponding to contacts 136 of said patent) and the closing of contacts 190 is fully described and shown in Fig. 1 of this patent.

As more fully described in this patent, the energization of the magnet 175 will rock an arm 226, shown in Fig. 9, and which corresponds to the arm designated by numeral 177 in Fig. 2 of the patent. The rocking of this arm will effect a clutch connection between the driving shaft 227, Fig. 9, of the motor and a driven shaft 228. By effecting the clutch connection, shaft 228 is rocked and also a gear 229, and which gear corresponds to the gear designated 163 in Fig. 2 of the Patent No. 1,976,618. As more fully described in this patent the rocking of the gear just mentioned will cause a power restoration of the card punching carriage at which time another card will be removed from the card supply hopper 141 to the punch carriage preparatory to punching a successive tabulating card.

*Location of punching mechanism*

In cash registers of the type herein disclosed, a cash drawer designated 229 in Figs. 1 and 9 is provided, and ordinarily this drawer is used as a cash drawer. In the present arrangement tabulating cards are punched and in the preferred type of accounting such machines would not be used for the reception of the money relating to the purchases of the articles for which tabulating cards are punched. For this reason the cash drawer may be conveniently used as means for carrying the punching machine and Fig. 9 of the present drawings shows how such punching mechanisms may be assembled therein. The drawer 229 is normally closed as shown in Fig. 1 and may be latched by any suitable means and upon the disabling of this latch the cash drawer may be pulled out so that access to the punching machine may be had for the purpose of removal of the punched cards, the insertion of a new supply of tabulating cards, or accessibility to the punching machine for the purpose of service, repairs, and adjustment. The wires in the cable 30a (Fig. 9) permit the viewing of the operation of the punching machine while it is in operation if desired.

In the event that the accounting machine is to be used as a cash register, a form of the latter wherein multiple cash drawers are utilized, as is well known in the art, may be provided for the purpose of enabling cash transactions to be handled and one of such drawers or an additional drawer may be used for the purpose of carrying the punching machine. From what has been previously described, it will be apparent that the present punching machine may be incorporated in a cash register of a well known type with minor alterations to the machine and without destroying in any respect its external appearance and operation.

*Selection of punching machine for operation*

It is desirable at times to be able to utilize the cash register without the use of the punching machine and to this end a switching mechanism is provided which will cut out, when desired, the operation of the punching mechanism permitting the customary use of the cash register. As best shown in Fig. 8, the switch 35 is adapted to connect the source of electrical current to the punching machine and when the switch is opened, as shown in Fig. 8, the circuits for the punching mechanism will be ineffective. An additional switch designated by reference numeral 230 in Fig. 8 is adapted to short circuit the relay contacts 37b permitting the normal closure of the circuit to the motor 16 of the cash register. It is obvious, therefore, that when the switch 35 is opened and the switch 230 is closed the cash register may be used without bringing the punching machine into operation.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cash register which includes, a slidable drawer mounted beneath the cash register and which is customarily used as a cash drawer, and exterior manipulative elements for effecting entries in said register in accordance with the positioning of differentially set elements thereof, the combination of punch operating elements of a punching machine, said punching machine being assembled in said drawer, electrical punch selecting elements in said cash register and including means mounted to said differentially set elements, and circuit connecting means between said punch selecting elements and the punch operating elements, whereby the operation of the punching machine may be effected while the drawer is within said register and said drawer may be pulled out for access to said punching machine during the operation of the cash register.

2. In a cash register which includes a slidable drawer mounted beneath the cash register and which is customarily used as a cash drawer, and exterior manipulative elements for effecting entries in said register in accordance with the positioning of differentially set elements thereof, the combination of punch operating elements of a punching machine, said punching machine being mounted within said drawer, electrical punch selecting elements in said register and including means mounted on said differentially set elements, and flexible circuit connecting wires intermediate said punch selecting elements and the punch operating elements to provide continuous circuit connections between said elements while the drawer is within the register, and when the drawer is pulled out for access to the punching machine while the latter is in operation under control of the cash register.

3. In a cash register which includes a slidable drawer mounted beneath the cash register and which is customarily used as a cash drawer, and including exterior manipulative elements for effecting entries in said register in accordance with the positioning of denominationally ordered differentially set elements thereof, the combination of punch operating elements of a punching machine, said punching machine being mounted within said drawer, a plurality of denominationally ordered commutators each of which comprises contact elements and includes switching elements mounted on said differentially set elements, and circuit connecting means intermediate said contact elements, said switch elements and said punch operating elements to cause the selection and operation of the latter in accordance with the entries in the cash register, said circuit connecting means being constructed and arranged to provide continuous circuit connections while the drawer is within the cash register, and when the drawer is pulled out of the cash register for access to the punching machine while the latter is in operation under control of the cash register.

FRED M. CARROLL.